Patented Aug. 4, 1936

2,049,896

UNITED STATES PATENT OFFICE 2,049,896

DYESTUFFS OF THE FLAVANTHRONE SERIES

William Dettwyler, Milwaukee, Wis., assignor to E. I. du Pont de Nemours & Company, Wilmington, Del., a corporation of Delaware No Drawing. Application May 24, 1933,
Serial No. 672,641

8 Claims. (Cl. 260—42)

This invention relates to novel vat dyestuffs of the flavanthrone series. More particularly, this invention deals with compounds of the flavanthrone series having a thiazole ring in each anthraquinone nucleus.

It is an object of this invention to prepare a novel series of organic compounds which are useful as vat dyestuffs.

It is a further object of this invention to prepare certain novel intermediates which are requisite in the manufacture of said vat dyestuffs.

Other and further important objects of this invention will appear as the description proceeds.

In accomplishing the objects of my invention, I start with an $\alpha,\alpha$-dihalogen-$\beta,\beta$-di-(acylamino)-anthraquinone, such as 1,5,2,6- or 1,8,2,7-dihalogen-di-(benzoylamino)-anthraquinone. This is condensed by the aid of a copper catalyst to the corresponding dihalogen-tetra-(benzoylamino)-1,1'-dianthraquinoyl. The latter is then subjected to simultaneous hydrolysis and ring closure to give $\alpha,\alpha'$-dihalogen-$\beta,\beta'$-diamino-flavanthrone in which each amino group is situated in ortho-position to the halogen atom. This compound is therefore adapted to form a dithiazole by fusing with sulfur and an azolating agent. By the latter term I am referring to compounds which are adapted to react with ortho-amino-aryl-mercaptans to form a thiazole ring. These compounds are generally aldehydes or compounds which behave like aldehydes in the sulfur melt, for instance, benzal chloride or benzotrichloride.

Without limiting my invention to any particular procedure, the following example is given to illustrate my specific mode of operation. Parts mentioned are by weght.

Step 1.—Preparation of the initial material 750 parts of dry nitrobenzene and 75 parts of 1,5-dichloro-2,6-diamino-anthraquinone are heated together to 170° C. and to this solution 75 parts of benzoyl chloride are added slowly, while maintaining a uniform temperature. The mass is then heated to 190° C. and held at this temperature for two hours. The 1,5-dichloro-2,6-di-(benzoylamino)-anthraquinone thus produced crystallizes out in yellow needles. The charge is then cooled to 30–40° C. and filtered, and the cake is washed with nitrobenzene and alcohol, and finally dried in the usual manner.

Step 2.—Preparation of the first intermediate 800 parts of dry nitrobenzene, 100 parts of 1,5-dichloro-2,6-di-(benzoylamino)-anthraquinone, 40 parts of copper powder, and 2 parts of soda ash are heated together to reflux temperature and held at this temperature about 20 hours. The color of the suspension changes from yellow to olive. The mass is now cooled to 20° C., and filtered. The filter cake is washed successively with nitrobenzene, alcohol, and hot water. The wet cake is suspended in 1000 parts of water, 100 parts of concentrated sulfuric acid and 50 parts of common salt are added, and the mass is warmed to 50° C. About 20 parts of sodium chlorate are then added gradually, until a distinct excess of chlorine is produced. After a further half hour at this temperature, the mass is filtered, and the filter cake is washed free of acid and dried as usual. The product is most probably 5,5'-dichloro-2,6,2',6'-tetra-benzoylamino-1,1'-dianthraquinonyl, of the formula:

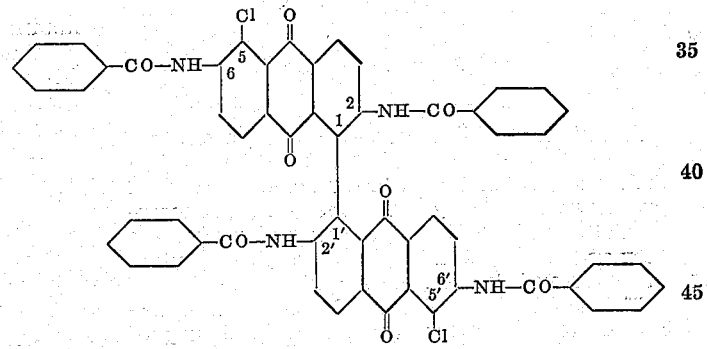

In dry state it has the form of short olive needles, practically insoluble in nitrobenzene, but soluble in concentrated sulfuric acid with a greenish-yellow color.

Step 3.—Ring closure to a flavanthrone body 80 parts of 5,5'-dichloro-2,6,2',6'-tetra-benzoyl-amino-1,1'-dianthraquinonyl are suspended in 800 parts of sulfuric acid, and heated to 85-90° C. until uniformly dispersed. The solution is then held at this temperature for two hours, after which time the hydrolysis and ring-closure is complete. The mass is then cooled to 20° C., poured into water, filtered, and washed acid free and dried. The product is most probably 5,5'-dichloro-6,6'-diamino-flavanthrone of the formula:

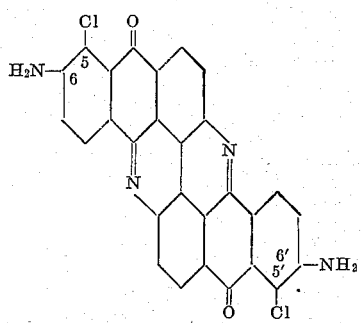

It is a brown powder, insoluble at room temperature in most organic solvents, but soluble in concentrated sulfuric acid with a greenish yellow color.

*Step 4.—Formation of the final dyestuff*

200 parts of naphthalene, 60 parts of 5,5-dichloro-6,6-diamino-flavanthrone, 30 parts of sulfur, and 150 parts of benzotrichloride are mixed together and heated gradually in about three hours' time to 215° C., and held at this temperature for eight hours. The mass is then cooled to 160° C. and 400 parts of o-dichlorobenzene are added. The mass is now further cooled to 90° C., filtered at this temperature, washed successively with o-dichlorobenzene and alcohol, and dried. The product is a greenish-yellow powder, which is soluble in sulfuric acid with a yellow color, and dyes cotton from a blue-violet vat a very greenish-yellow shade. It is most probably $\omega,\omega'$-diphenyl-5,6,5',6'-flavanthrone-dithiazole of the following probable formula:

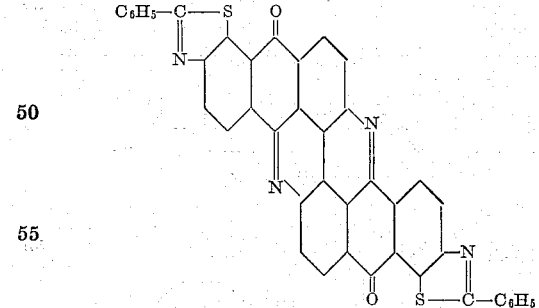

If instead of 1,5-dichoro-2,6-diamino-anthraquinone, one starts in the first step with 1,8-dichloro-2,7-diamino-anthraquinone, the rest of procedure remaining the same, isomeric intermediates and dyestuff are obtained which are very similar in properties to the respective intermediates and dyestuff above described.

If instead of 1,5-dichloro-2,6-di-(benzoylamino-anthraquinone prepared in the first step of the procedure, one starts with 1,5-dichloro-2,6-di-(acetylamino)-anthraquinone, prepared in known manner from 1,5-dichloro-2,6-diamino-anthraquinone and acetic anhydride, one obtains at the end of the second step 5,5'-dichloro-2,6,2',6'-tetra-(acetylamino-1,1'-dianthraquinonyl, which is very similar in physical properties to the tetrabenzoyl derivative above described. When this tetraacetyl compound is now subjected to ring-closure and thiazole formation as above described, it gives the identical compounds described under Steps 3 and 4 above.

It will be understood that many other variations and modifications are possible in my preferred procedure without departing from the spirit of this invention.

I claim:

1. A dyestuff of the $\omega,\omega$-diphenyl-flavanthrone-dithiazole series, said dyestuff being when dry a greenish-yellow powder, soluble in sulfuric acid with a yellow color, and dyeing cotton from a blue-violet vat in greenish-yellow shades.

2. $\omega,\omega'$-diphenyl-5,6,5',6'-flavanthrone-dithiazole.

3. $\omega,\omega'$-diphenyl-7,8,7',8',-flavanthrone-dithiazole.

4. The process of preparing a compound of the flavanthrone-dithiazole series which comprises condensing an $\alpha,\alpha$-dihalogen-$\beta,\beta$-diacyl-amino-anthraquinone in which one halogen and acyl-amino group is attached to each benzene nuclei of the anthraquinone molecule in ortho position to each other to form a dihalogen-tetraacyl-tetramino-1,1-dianthraquinonyl, ring closing the latter with simultaneous hydrolysis to form an $\alpha,\alpha'$-dihalogen-$\beta,\beta'$-diamino-flavanthrone, and reacting upon the latter with a compound that will react with alpha-mercapto-ortho-aminoanthraquinone to form a thiazole ring in the presence of sulfur to form the thiazole rings.

5. The process of preparing a vat dyestuff, which comprises condensing an $\alpha,\alpha$-dihalogen-$\beta,\beta$-diacylamino-anthraquinone in which one halogen and acylamino group is attached to each benzene nuclei of the anthraquinone molecule in ortho position to each other to form a dihalogen-tetraacyl-tetramino-1,1'-dianthraquinonyl, ring closing the latter with simultaneous hydrolysis to form an $\alpha,\alpha'$-dihalogen-$\beta,\beta'$-diamino-flavanthrone, and fusing the latter with sulfur and benzotrichloride to form phenyl-thiazole rings.

6. The process of preparing a vat dyestuff, which comprises condensing a 1,5-dichloro-2,6-dibenzoyl-diamino-anthraquinone to form 5,5'-dichloro-2,6,2',6'-tetra-benzoyl-tetramino-1,1'-dianthraquinonyl, ring closing the latter with simultaneous hydrolysis to form 5,5'-dichloro-6,6'-diamino-flavanthrone, and fusing the latter with sulfur and benzotrichloride to form $\omega,\omega'$-diphenyl-flavanthrone-dithiazole.

7. In the process of preparing a vat dyestuff, the step which comprises subjecting an $\alpha,\alpha$-dihalogen-flavanthrone having an amino group in ortho position to each halogen atom to sulfur fusion in the presence of a compound that will react with alpha-mercapto-ortho-aminoanthraquinone to form a thiazole ring.

8. In the process of preparing a vat dyestuff, the step which comprises subjecting 5,5'-dichloro-6,6'-diamino-flavanthrone to sulfur fusion in the presence of benzo-trichloride.

WILLIAM DETTWYLER.